United States Patent [19]

Grantham et al.

[11] Patent Number: 4,467,394

[45] Date of Patent: Aug. 21, 1984

[54] THREE PLATE SILICON-GLASS-SILICON CAPACITIVE PRESSURE TRANSDUCER

[75] Inventors: Daniel H. Grantham, Glastonbury; James L. Swindal, East Hampton, both of Conn.

[73] Assignee: United Technologies Corporation, Hartford, Conn.

[21] Appl. No.: 527,531

[22] Filed: Aug. 29, 1983

[51] Int. Cl.³ .......................... H01G 7/00; G01L 9/12
[52] U.S. Cl. ........................................ 361/283; 73/718
[58] Field of Search ................... 361/283; 73/718, 724

[56] References Cited

U.S. PATENT DOCUMENTS

| | | | |
|---|---|---|---|
| 3,634,727 | 1/1972 | Polye | 361/283 X |
| 3,858,097 | 12/1974 | Polye | 361/283 |
| 4,198,670 | 4/1980 | Mann | 361/283 |
| 4,380,041 | 4/1983 | Ho | 73/724 X |
| 4,424,713 | 1/1984 | Kroninger et al. | 361/283 X |

Primary Examiner—Donald A. Griffin
Attorney, Agent, or Firm—Dominic J. Chiantera

[57] ABSTRACT

A three plate silicon-glass-silicon capacitive pressure transducer includes a conductive silicon diaphragm and substrate relatively spaced by a dielectric body having disposed therein a central electrode positioned between the diaphragm and substrate to form a pressure responsive capacitance with the diaphragm at a value inversely proportional to a pressure signal applied to a pressure sensing surface of the diaphragm.

15 Claims, 7 Drawing Figures

THREE PLATE SILICON-GLASS-SILICON CAPACITIVE PRESSURE TRANSDUCER

DESCRIPTION

1. Technical Field

This invention relates to capacitive pressure transducers, and more particularly to silicon-glass-silicon (SGS) capacitive pressure transducers.

2. Background Art

Silicon capacitor pressure transducers are known in the art, as described in U.S. Pat. No. 3,634,727 to Polye. The Polye pressure transducer includes a pair of silicon discs functioning as capacitor plates, each having a central aperture. The two discs are vacuum joined along their periphery with a silicon-gold eutectic metallic bond to form an internal vacuum chamber. The discs, when exposed to an applied pressure, flex relative to each other to change the capacitance value between them. This change in the device output capacitance is the manifestation of sensed pressure. Since the transducer has a quiescent output capacitance value, the sensed pressure accuracy is dependent on the magnitude of the change in the pressure responsive capacitance versus the quiescent capacitance. The quiescent value includes both the static capacitance value of the pressure responsive capacitance plus the value of the nonpressure responsive capacitance, i.e. the transducer's parasitic capacitance.

The Polye device has relatively high parasitic capacitance values. This is due to the transducer's architecture where the surface area of the peripheral bond between the silicon discs is substantial when compared with the cross-sectional area of the flexible (i.e. pressure responsive) portion of the discs. In addition, the bonded surfaces of the discs are much closer to each other than the surfaces of the deflectable portion so that they provide a high capacitance value per unit area. The result is significant parasitic capacitance which masks the output capacitance change ($\Delta C_o$), resulting in low signal to noise ratio.

In our two copending applications of common assignee, entitled: ELECTROSTATIC BONDED, SILICON CAPACITIVE PRESSURE TRANSDUCER (U.S. Ser. No. 310,597, now U.S. Pat. No. 4,415,948 issued Nov. 15, 1983) and SILICON-GLASS-SILICON CAPACITIVE PRESSURE TRANSDUCER (U.S. Ser. No. 310,598, now U.S. Pat. No. 4,405,970 issued Sept. 20, 1983), filed together on Oct. 13, 1981, we disclosed two plate SGS capacitve pressure transducers having structures with high signal-to-noise ratios. The parasitic capacitance of the structure was reduced by spacing the pressure sensitive silicon discs at distances no greater than that between the joining surfaces. This is achieved by selective topographical shaping of the interior glass borosilicate spacer to create pedestals. These devices provide larger variations in the pressure responsive capacitance for relatively modest changes in actual pressure. However, they still exhibit a finite parasitic capacitance, which may represent the practically achievable minimum for two plate devices.

DISCLOSURE OF INVENTION

One object of the present invention is to provide a capacitive pressure transducer structure which reduces parasitic capacitance to less than that achievable in the the prior art two plate devices. Another object of the present invention is to provide a structure which itself facilitates elimination of the gain attenuation effects of parasitic capacitance in the processing of the transducer signal output.

According to the present invention, a capacitive pressure transducer includes a pressure responsive silicon diaphragm and silicon substrate spaced apart by a glass dielectric body having an electrode disposed therein between the diaphragm and substrate, the electrode positioned at an opposite end of a pressure sensitive interstice from the diaphragm so as to form a pressure responsive capacitance in combination with the diaphragm, at an instantaneous value dependent on the magnitude of a pressure signal applied to the diaphragm, the transducer having major nonpressure responsive parasitic capacitances between the electrode and substrate and the substrate and diaphragm, such that the transducer's quiescent output capacitance includes the series equivalent of the parasitic capacitance values in parallel with the pressure responsive capacitance value.

In further accord with the present invention all three plates, the diaphragm, substrate and electrode are electrically conductive, the diaphragm and substrate being conductive silicon and the electrode being preferably metal, to allow direct connection of electronic signal conditioning apparatus to all three plates to facilitate the elimination, by signal conditioning, of the electrode to substrate capacitance, thereby eliminating parasitic capacitance signal attenuation of the transducer output. In still further accord with the present invention the central electrode includes a central plateau portion with major surfaces parallel to major surfaces on each of the diaphragm and substrate plates, the diameter of the central plateau being less than that of both the diaphragm and substrate.

The capacitive pressure transducer of the present invention is a three plate device, by addition of a central electrode positioned between the diaphragm and substrate. As a result, spacing between the pressure responsive capacitance plates is reduced, and the parasitic capacitance is divided into segments so as to facilitate cancellation with associated signal conditioning apparatus. The parasitic capacitance between electrode and substrate is in series with that between the substrate and diaphragm which, together, are in parallel with the pressure responsive capacitance between the electrode to diaphragm junction of the transducer. As a result the absolute value of the parasitic capacitance is reduced.

Furthermore, by providing separate signals to the electrode to diaphragm junction, the electrode to substrate junction, and the substrate to diaphragm junctions of the transducer, the pressure responsive capacitance is effectively isolated from the attenuating effects of the parasitic capacitance, as described in detail in a copending application of the same assignee, entitled: CAPACITIVE PRESSURE TRANSDUCER SIGNAL CONDITIONING CIRCUIT, U.S. Ser. No. 527,530, filed on even date herewith by Barry Male. As a result, the present capacitive transducer structure is well suited for low pressure applications due to the high gain sensitivity achievable by the transducer's output capacitance.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 1:
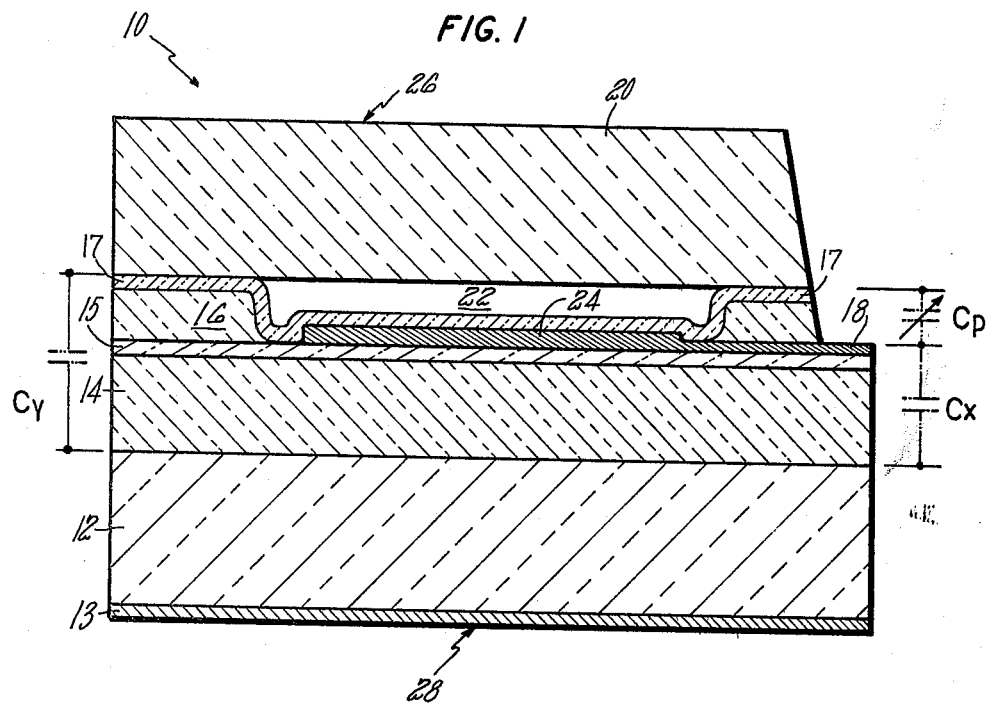
FIG. 1 is an elevated cross section of the SGS capacitive pressure transducer structure of the present invention.

FIG. 1 is an elevated cross section view, not to scale, of the present (SGS) capacitive pressure transducer 10. A silicon (Si) substrate 12 having a metal electrode 13 on a base side is bonded on a mounting side to a glass dielectric laminate having four layers 14-17 of borosilicate glass, e.g. Corning 7070 Glass, or "Pyrex". The glass dielectric layers support a center electrode 18 in position between the substrate and a pressure responsive silicon diaphragm 20. A chamber, or interstice 22 is formed in the glass dielectric concentric with a central plateau portion 24 of the central electrode. The chamber allows diaphragm flexure in response to pressure signals applied to sensing surface 26. Diaphragm flexure changes the value of the interstitial capacitance between diaphragm and electrode, which transduces the applied pressure signal to a measurable electronic signal. For absolute pressure measurements, the outer surface 28 of the substrate electrode is exposed to a vacuum. In the case of ΔP measurements, surfaces 26, 28 (diaphragm and substrate electrode) are exposed to the different pressure signals between which the difference pressure is to be measured.

Figure 2:
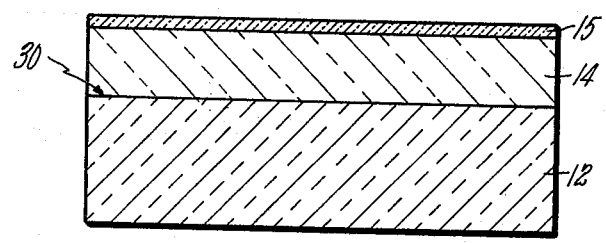
FIGS. 2-6 are sequential elevated cross sections taken along the same section as the structure of FIG. 1 showing the fabrication sequence of the FIG. 1 transducer structure.

Referring to FIG. 2, fabrication of the three plate transducer begins with preparing a silicon base substrate 12 to a selected thickness. The actual thickness depends on the transducer's sensed pressure range. For a 0-50 PSI device the substrate would be on the order of 800 Microns ($\mu M$). A first layer 14 of borosilicate glass dielectric, typically Corning 7070 Glass, or "Pyrex", if rf sputtered on the substrate surface 30. The sputtering is done with 25% oxygen. To ensure that the glass is sufficiently oxidized to take full advantage of the borosilicate properties, e.g. dielectric and expansion coefficients, the deposited layer is annealed by exposure to steam at elevated temperatures, on the order of 555° C., for one hour. Annealing saturates the glass to provide a "wet" glass layer. This "relaxes" the glass and promotes a better field assisted bond of the glass to the silicon substrate.

Following annealing, a thin borosilicate glass layer 15 is rf sputtered over the "wet" glass to a thickness of approximately 0.5 $\mu M$. This second layer, which is not annealed ("dry glass"), seals the wet glass to allow metallization of the center metal electrode 18.

Figure 3:
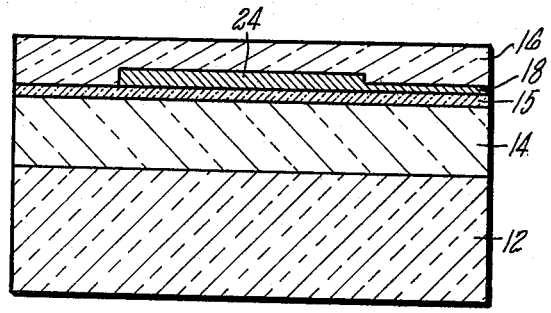

The metal electrode 18 (FIG. 3) is formed on the exposed surface of layer 15 by deposition of electrically conductive material, including metals, such as chromium, aluminum, or copper, or semiconductors, such as silicon. The electrode is deposited to a thickness on the order of 0.5 $\mu M$ using known techniques, such as rf sputtering, vacuum evaporation, or chemical vapor deposition. The electrode layer is geometrically patterned using standard photolithography and etching procedures to form a plateau 24 at one end. The plateau, forms a capacitor plate which in combination with the diaphragm provides the pressure sensitive capacitor element.

The plateau surface area, which may be circular, is essentially concentric with substrate surface 30. An alternative, less desirable method of depositing and patterning the electrode involves the use of a metal mask. This eliminates the photo resistant etching procedures, but is less accurate. Following complete electrode formation, a third layer 16 of borosilicate glass is deposited over the electrode and the exposed surface area of layer 15. This third glass layer is similarly deposited by rf sputtering to a thickness on the order of 2 $\mu M$.

Figure 4:
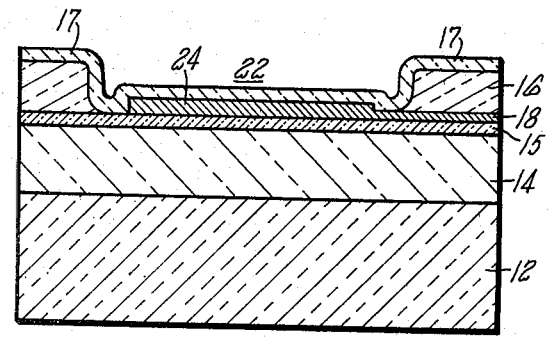

FIG. 4 illustrates the results of the next steps of forming an aperture, or well, 22 in layer 16, concentric with the plateau 24 surface of the electrode, and sealing this aperture with glass layer 17. The aperture is formed by known photolithographic techniques and use of a selective etching compound, such as hydroflouric acid, which attacks the glass dielectric layer but not the electrode. The well diameter at the exposed surface of layer 16 is greater than that of the plateau to allow for that portion of the diaphragm which cannot flex; the part immediately adjacent to the upper periphery of the well, which is constrained. Extending the plateau surface area into this "fringe" area of the diaphragm would only add to the parasitic capacitance. The exposed metal of the electrode itself acts as an etch stop, for control of the critical dimension of the vacuum cavity. Over etching the glass in a small annular area surrounding the electrode does not significantly affect the device properties.

The layer 17 of borosilicate glass is then sputtered over the etched surface, e.g. the remaining surface area of layer 16, the exposed surface of the electrode plateau 24 at the bottom of the well, and any exposed surfaces of layer 15. Although other techniques may be used for depositing all of the glass layers, sputtering allows for exacting dimensional control. This thickness of layer 17 is similarly on the order of 0.5 $\mu M$. This seals the electrode surface so as to prevent arcing during the later field assisted bonding step, and also prevents electrical shorting of the diaphragm (20, FIG. 1) interior surface to the electrode under severe deflection.

Figure 5:
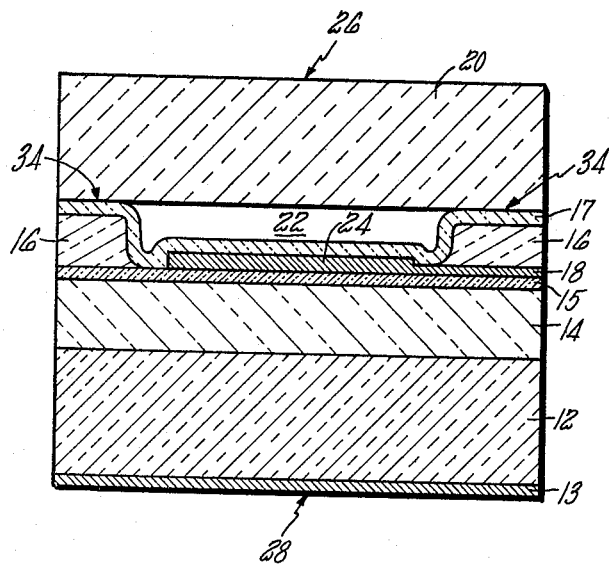
Figure 6:
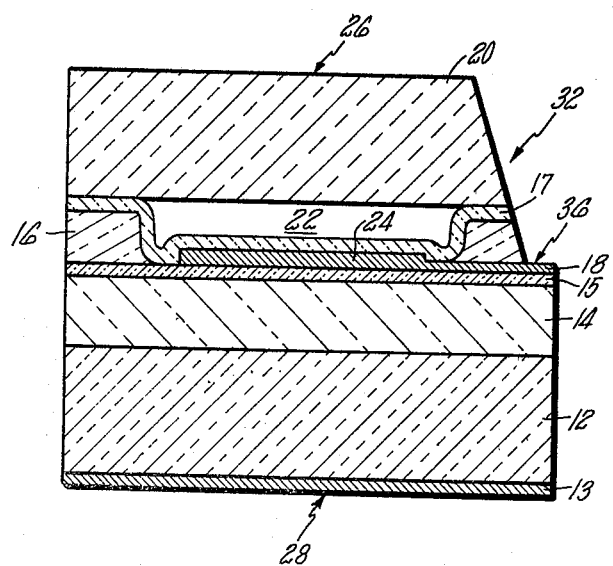

FIGS. 5, 6 illustrate the remaining steps in fabrication. The silicon diaphragm 20 is processed to a selected thickness. For the 0-50 PSI sensed pressure range the diaphgram thickness is selected to provide 2.0 $\mu M$ deflection. The diaphragm is then field-assist bonded to the structure by placing the diaphragm in close proximity to the exposed peripheral surface 34 of the borosilicate layer 17. The diaphragm and structure are then heated to temperatures in the range of 500° C., in a vacuum chamber at approximately $10^{-6}$ Torr pressure, with a DC voltage between 75-125 VDC applied from the diaphragm 20 (+) to the glass layer 17 (−) for five to ten minutes. The resulting electrostatic field causes the diaphragm and glass layer 17 to attract each other as the current flow through the silicon glass interface provides a seal around the surface 34 to transform the well 22 into a vacuum chamber.

The substrate electrode 13 is formed on the completed structure by rf sputtering conductive metalization on the exposed outside substrate surface. The metalization may be applied in two layers, a first layer of nickel on the order of 500 angstroms, deposited directly on the silicon substrate surface, and a second layer of gold, approximately 5,000 angstroms, deposited on the nickel to allow wire bonding for electrical connection. It should be understood, however, that other methods may be used, such as alloying gold without recourse to the nickel layer. All of which is known in the art.

FIG. 6 illustrates the last step of etching the transducer structure from the silicon diaphragm 20 down through glass layers 16, 17, to expose contact surface 36 of the electrode 18. A conductive metal layer such as nickel, gold, may then be deposited to again provide electrical connection to the center electrode. The nickel-gold cannot be deposited prior to electrostatic bonding since the bonding temperatures are above the gold-silicon eutectic temperature, and the nickel layer does not isolate them.

In the present three plate SGS capacitive pressure transducer, the pressure responsive capacitor plates, i.e. the electrode plateau 24 and diaphragm 20 (FIG. 1), are in close proximity; closer than the diaphragm to substrate or electrode to substrate spacing to provide a higher capacity per unit area for the pressure responsive capacitor than the parasitic capacitors. For the 0-50 PSI transducer the plateau cross-sectional area and that of the mating surface of the diaphragm is on the order of 0.114 cm$^2$. The surface area of the diaphragm and substrate not masked by the electrode plateau surface, i.e. the "fringe area", is approximately twice that of the plateau; on the order of 0.25 cm$^2$. The plate spacing (d), however, differs by nearly 450 to 1. The spacing between the plateau and diaphragm is approximately 2.0 microns at P=0 PSI; that between the diaphragm and substrate is on the order 8.0 microns. Of course the diaphragm to substrate cpaacitance has a borosilicate glass dielectric with a higher dielectric constant (4.25) than the pressure responsive capacitance which is in a vacuum (K=1.0).

Appendix A illustrates the distributed capacitances of the transducer in a simplified schematic illustration (A). The pressure responsive capacitance $C_p$ is across the electrode (E) to diaphragm (D) junction. The electrode (E) to substrate (S) junction includes parasitic capacitances $C_1$ (that occurring between the glass dielectric layer 17 and the surface of the electrode plateau 24) and $C_2$ (that between the electrode plateau and substrate). Parasitic capacitances $C_3$–$C_5$ exist between the diaphragm (D) and substrate (S). Capacitance $C_3$ is in the vacuum of chamber 22 (FIG. 1), between the diaphragm and the bottom of the chamber outside of the plateau; the dielectric constant is 1.0. Capacitance $C_4$ is within the dielectric between the chamber and the substrate. Finally, capacitance $C_5$ is between the unmasked surfaces of the diaphragm (D) and substrate (S).

Appendix A lists typical values for the capacitor's dielectric constant (K), plate area (A) and plate saving (d) for a 0-50 PSI transducer. The parasitic capacitances are resolved into two major values;

$$C_x = \frac{C_1 \cdot C_2}{C_1 + C_2} \text{ and } C_y = C_5 + \frac{C_3 \cdot C_4}{C_3 \cdot C_4},$$

as illustrated in drawing (B). The two values are $C_x = 66 \times 10^{-12} f$ and $C_Y = 124.13 \times 10^{-12} f$. The two parasitic capacitances are in electrical series and sum together as the ratio of the product to the sum, or $C' = 43 \times 10^{-12} f$.

The zero PSI value for capacitance $C_p = 50.44 \times 10^{-12} f$ and at 50 PSI $C_p = 140.44 \times 10^{-12} f$. The change in output capacitance ($\Delta C_o$) from zero to 50 PSI is on the order of twice the zero PSI quiescent value.

Figure 7:
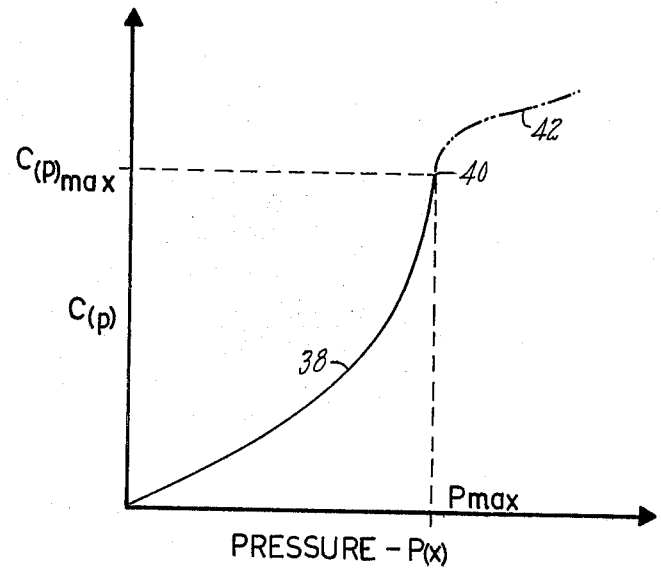
FIG. 7 is a waveform illustration of one operating characteristic of the transducer embodiment of FIG. 1.

Waveform 38 of FIG. 7 illustrates the change in the $C_p$ capacitance $C_p$ as a function of the sensed pressure signal magnitude. The waveform is nonlinear, but continuous up to a maximum $P_{MAX}$ value 40 at which point the curve becomes less sensitive due to physical contact of the diaphragm with the electrode.

The three plate capacitive pressure transducer architecture permits the plates of the sensing capacitance to be in closer proximity than the nonpressure responsive capacitances. This allows for a relatively high capacitance per unit area which helps equalize the sensing capacitor quiescent value with that of the parasitic capacitance. In addition, with all three plates being conductive, i.e. diaphragm and substrate being conductive silicon (specified N doping levels to allow direct electrical connection) and the electrode being either conductive silicon or metal, the signal conditioning circuitry of the before referenced copending application may be directly connected. As described therein, as is illustrated simply in sketch (C) of Appendix A, the conditioning circuitry provides the electrode (E) and substrate (S) with equal phase and magnitude current signals ($I_O$, $I_Z$) resulting in zero current flow through the parasitic capacitance $C_X$. All of the sensing current ($I_O$) flows through the pressure responsive capacitance $C_p$, effectively neutralizing (and making an equivalent zero) the parasitic capacitance ($C_x$). The result is a quiescent capacitance equal to the pressure responsive capacitance. At zero PSI, $C_O = C_p = 183.5 \times 10^{-12}$. A gain of 1.8 compared with a gain of approximately 0.95 without the signal conditioning. As such, the three plate transducer may be used in extremely low sensed pressure applications in which the highest gain sensitivity is required.

Similarly, although the invention has been shown and described with respect to a best mode embodiment thereof, it should be understood by those skilled in the art that the foregoing and various other changes and omissions in the form and detail thereof may be made therein without departing from the spirit and scope of the invention.

Having thus described a best mode of our invention that which we claim as new and desired to secure by Letters Patent is:

1. A pressure transducer for providing a manifestation of the magnitude of a pressure signal applied to a pressure sensing surface thereof comprising:
   first and second silicon pieces, said first piece including a pressure sensing surface; and
   a dielectric body mounted at opposite ends thereof to said first and second silicon pieces and having an electrode with opposing first and second major surfaces disposed therein in register with said first and second silicon pieces, respectively, said electrode first surface and said first silicon piece disposed at opposite ends of an aperture formed in said dielectric body to provide a pressure responsive capacitance having an instantaneous value in dependence on, and in manifestation of, the magnitude of pressure signal applied to said first silicon piece pressure sensing surface.

2. The pressure transducer of claim 1, wherein said first and second silicon pieces and said electrode are electrically conductive.

3. The pressure transducer of claim 2, wherein said electrode comprises electrically conductive silicon.

4. The transducer of claim 1, wherein said dielectric body comprises borosilicate glass.

5. The transducer of claim 4, wherein said borosilicate glass comprises Corning 7070 Glass.

6. The transducer of claim 1, wherein the distance between said electrode first major surface and said first silicon piece is shorter than the distance between said electrode second major surface and said second silicon piece.

7. The method of fabricating a pressure transducer of the type providing a capacitive indication of the magnitude of a pressure signal applied to a sensing surface thereof, comprising the steps of:

depositing several preliminary layers of borosilicate glass on an electrically conductive silicon substrate;

forming an electrically conductive electrode on the exposed surface of said preliminary layers;

depositing several secondary layers of borosilicate glass on said formed electrode and said preliminary layers of glass;

creating an aperture in said secondary layers of glass, concentric with said electrode; and sealing, in a vacuum, the exposed surface of said secondary layers of glass and said aperture with an electrically conductive silicon diaphragm having a sensing surface on an exposed major surface thereof, in register with said aperture, for providing in combination with said electrode the capacitive indication of the magnitude of a pressure signal applied to said diaphragm sensing surface.

8. The method of claim 7, further comprising between said steps of creating and sealing, the step of:

coating the surface of said aperture and any exposed surface area of said electrode.

9. The method of claim 7, wherein said step of creating an aperture includes the use of a selective etching compound which attacks the borosilicate glass but not the electrode material, whereby said electrode material provides an etch stop in the creation of said aperture.

10. The method of claim 7, wherein said step of creating an aperture provides an aperture extending through said secondary layers of glass to said electrode, at an aperture diameter greater than said electrode diameter.

11. The method of claim 7, wherein said step of depositing several preliminary layers of borosilicate glass includes the steps of:

applying a first layer of borosilicate glass to an exposed surface of said silicon substrate;

annealing said first layer of glass in a steam bath at a temperature greater than 500° C.; and applying a second layer of borosilicate glass to said annealled first layer to seal said first layer to allow formation of said electrode.

12. The method of claim 11, wherein said step of applying a first layer comprises the step of:

sputtering said first layer of borosilicate glass with at least twenty-five percent oxygen.

13. The method of claim 7, wherein said borosilicate is Corning 7070 Glass.

14. The method of claim 7, wherein said step of sealing comprises the process of field assist bonding of said diaphragm to said secondary layers exposed surface.

15. The method of claim 7, further comprising the step of:

depositing electrically conductive metal layers on each of said substrate, said electrode, and said diaphragm to allow direct electrical connection to each.

* * * * *

UNITED STATES PATENT AND TRADEMARK OFFICE
CERTIFICATE OF CORRECTION

PATENT NO. : 4,467,394

DATED : August 21, 1984

INVENTOR(S) : Daniel H. Grantham, James L. Swindal

Page 1 of 3

It is certified that error appears in the above-identified patent and that said Letters Patent is hereby corrected as shown below:

Column 6, between lines 43 and 44    insert the attached

APPENDIX A

Signed and Sealed this

Nineteenth Day of March 1985

[SEAL]

Attest:

DONALD J. QUIGG

Attesting Officer

Acting Commissioner of Patents and Trademarks

APPENDIX A

Capacitance $C = \frac{K \cdot \varepsilon_0 \cdot A}{d}$

Where:

$\varepsilon_0$ = permittivity of free space
   ($\simeq 8.85 \times 10^{-14}$ f/CM)

K = dielectric constant
   $K_p, K_3 \simeq 1.0$
   $K_1, K_2, K_4, K_5 \simeq 4.25$ A = capacitor plate area:
   $A_p \simeq 0.114$ CM$^2$
   $A_1 \simeq 0.114$ CM$^2$
   $A_2 \simeq 0.114$ CM$^2$
   $A_3 \simeq 0.069$ CM$^2$
   $A_4 \simeq 0.069$ CM$^2$
   $A_5 \simeq 0.253$ CM$^2$ d = distance between plates:
   $d_{p(P=0)} \simeq 2.0$ μM
   $d_1 \simeq 0.5 \times 10^{-4}$ CM
   $d_2 \simeq 6.0 \times 10^{-4}$ CM
   $d_3 \simeq 2.3 \times 10^{-4}$ CM
   $d_4 \simeq 6.5 \times 10^{-4}$ CM
   $d_5 \simeq 8.8 \times 10^{-4}$ CM Capacitance Values:
   $C_{P(p=0)} \simeq 50.44 \times 10^{-12}$ f
   $C_1 \simeq 857.6 \times 10^{-12}$ f
   $C_2 \simeq 71.5 \times 10^{-12}$ f
   $C_3 \simeq 26.5 \times 10^{-12}$ f
   $C_4 \simeq 39.9 \times 10^{-12}$ f
   $C_5 \simeq 108.2 \times 10^{-12}$ f $C_x \simeq 66 \times 10^{-12}$ f
$C_Y \simeq 124.13 \times 10^{-12}$ f Sum parasitic capacitance $C' = \frac{C_x \cdot C_Y}{C_x + C_Y} \simeq 43 \times 10^{-12}$ f

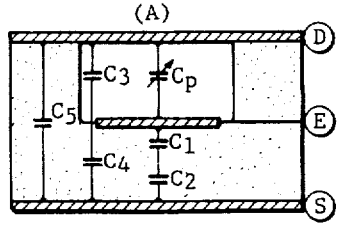

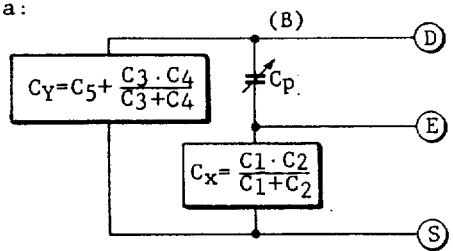

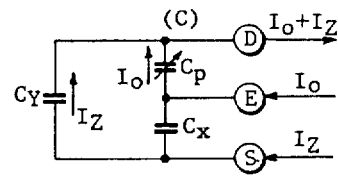

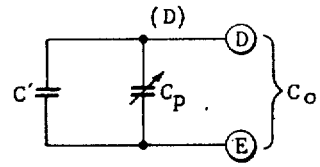

APPENDIX A (Continued)

Output capacitance $C_o$:

<u>at P=0</u>; $C_p \simeq 50.44 \times 10^{-12} f$ $C_o = C_p + C' \simeq 94.2 \times 10^{-12} f$ <u>at P=50 PSI</u>; $C_p \simeq 140.44 \times 10^{-12} f$ $C_o \simeq 183.5 \times 10^{-12} f$ $\Delta C_o \simeq 89.3 \times 10^{-12} f$ (0-50 PSI)